(12) United States Patent
Ning et al.

(10) Patent No.: US 6,303,177 B1
(45) Date of Patent: Oct. 16, 2001

(54) SOY CONTAINING BREAKFAST CEREAL

(75) Inventors: Luping L. Ning, Valley Park, MO (US); James L. Holbrook, Troy, IL (US); Phillip S. Kerr, Wildwood, MO (US)

(73) Assignee: Protein Technologies International, Inc, St. Louis, MO (US)

( * ) Notice: Subject to any disclaimer, the term of this patent is extended or adjusted under 35 U.S.C. 154(b) by 0 days.

(21) Appl. No.: 09/519,324

(22) Filed: Mar. 6, 2000

(51) Int. Cl.$^7$ ........................................ A23L 1/164
(52) U.S. Cl. ........................... 426/620; 426/2; 426/621; 426/634
(58) Field of Search .................. 426/620, 634, 426/621, 2

(56) References Cited

U.S. PATENT DOCUMENTS

| | | | |
|---|---|---|---|
| 2,421,216 | 5/1947 | Penty | 99/83 |
| 3,920,852 | 11/1975 | Haas | 426/62 |
| 4,478,857 | 10/1984 | Stauss | 426/72 |
| 4,645,677 | 2/1987 | Lawhon et al. | 426/431 |
| 4,988,521 | 1/1991 | Fan | 426/93 |
| 5,100,679 | 3/1992 | Delrue | 426/44 |
| 5,176,936 | 1/1993 | Creighton et al. | 426/618 |
| 5,182,127 | 1/1993 | Schwab et al. | 426/241 |
| 5,368,870 | 11/1994 | Efstathiou | 426/73 |
| 5,382,443 | 1/1995 | Kincaid et al. | 426/620 |
| 5,558,890 | 9/1996 | Brown et al. | 426/94 |
| 5,648,210 | 7/1997 | Kerr et al. | 435/6 |
| 5,710,365 | 1/1998 | Kerr et al. | 800/200 |
| 5,858,449 | 1/1999 | Crank et al. | 426/656 |
| 5,871,801 | * 2/1999 | Kazemzadeh | 426/634 |
| 5,919,503 | 7/1999 | Leusner | 426/96 |
| 5,936,069 | * 8/1999 | Johnson | 426/472 |

FOREIGN PATENT DOCUMENTS

98/45448   10/1998   (WO) .

* cited by examiner

Primary Examiner—Helen Pratt
(74) Attorney, Agent, or Firm—Richard B. Taylor

(57) ABSTRACT

The present invention provides a breakfast cereal for human consumption that contains at least one cereal grain and a soy material selected from soy flour, soy grits, soy flakes, a comminuted whole soybean material, or combinations thereof. The soy material contains at most 20 $\mu$mol/g raffinose and 35 $\mu$mol/g stachyose, and at least 200 $\mu$mol/g sucrose. A process for producing such a breakfast cereal is also provided in which at least one cereal grain and a soy material selected from a soy flour, soy grits, soy flakes, a comminuted whole soybean material, or combinations thereof are blended, cooked to form a cereal dough, and a ready-to-eat cereal is formed from the cereal dough. The soy material contains at most 20 $\mu$mol/g raffinose and 35 $\mu$mol/g stachyose, and at least 200 $\mu$mol/g sucrose. A process of reducing coronary heart disease risk in a human is also provided in which a cereal containing a soy material containing at most 20 $\mu$mol/g raffinose and 35 $\mu$mol/g stachyose, and at least 200 $\mu$mol/g sucrose is administered to a human.

41 Claims, No Drawings

SOY CONTAINING BREAKFAST CEREAL

FIELD OF THE INVENTION

The present invention relates to a novel breakfast cereal composition and the process of making the same.

BACKGROUND OF THE INVENTION

Ready-to-eat breakfast cereals are popular food items which provide a good source of nutrition. Typical ready-to-eat breakfast cereals are prepared in a variety of ways to provide different textures and mouthfeel. Such breakfast cereals include flaked cereals, puffed cereals, and shredded cereals.

Ready-to-eat cereals are formulated primarily with cereal grains, and may contain one or more cereal grains. The cereal grains utilized, such as corn, wheat, rice, barley, and the like, have a high starch content but relatively little protein. A cereal having more protein content, therefore, is desirable from a nutritional standpoint.

Soybeans are an excellent source of protein, and it has been recognized in the past, for example in U.S. Pat. No. 2,421,216, that combining soy protein and other high starch cereal grains in a ready-to-eat breakfast cereal would provide a breakfast cereal with an improved nutritional profile. Soy protein has a desirable amino acid profile for nutritional purposes, and includes other health promoting elements such as phytoestrogens. Soy protein has also recently been shown to lower blood cholesterol concentrations in hyper-cholesterolemic individuals. A breakfast cereal containing soy protein, therefore, is very desirable since the cereal would provide an excellent source of protein, a good nutritional amino acid profile, and could be used to lower blood cholesterol concentration in hypercholesterolemic consumers.

Unfortunately, soy protein has not been widely used in ready-to-eat breakfast cereals for several reasons. First, inexpensive but relatively unprocessed comminuted whole soybeans and soy flours, grits, and flakes contain high levels of oligosaccharides, especially raffinose and stachyose, which induce intestinal gas and corresponding discomfort and flatus. Humans lack the α-galactosidase enzyme needed to break down and digest complex oligosaccharides such as raffinose and stachyose into simple carbohydrates such as glucose, fructose, and sucrose which can be easily absorbed by the gut. Instead of being absorbed by the gut, soy raffinose and stachyose enter the lower intestine where they are fermented by bacteria to cause intestinal gas and flatus. The demand for comminuted whole soybeans and soy flours, grits, and flakes in cereals, therefore, has been understandably muted.

Second, the relatively unprocessed comminuted whole soybeans and soy flours, grits, and flakes have a beany and bitter taste which diminishes the palatability of a cereal incorporating these materials. The poor palatability of the comminuted whole soybeans and soy flours, grits, and flakes, combined with their poor digestability, has made such soy materials unattractive for incorporation into cereals.

Third, soy materials which have been processed to remove oligosaccharides and poor taste factors (e.g. soy protein concentrates and soy protein isolates) are substantially more expensive ingredients than comminuted whole soybeans or soy flours, grits, and flakes. Soy protein concentrates and soy protein isolates are formed from soy flour, grits, or flakes which are processed to remove water soluble and/or alcohol soluble components, including raffinose and stachyose. Soy protein concentrates are formed by:

i) washing a soy flour/flake/grit material with an aqueous alcohol; ii) leaching a soy flour/flake/grit material with an aqueous acid having a pH around the isoelectric point of soy protein (pH 4.5); or extracting a soy flake/flour/grit material with a moist heat (e.g. steam). Soy protein isolates are formed from a soy flake/flour/grit material by extracting the protein with an aqueous alkali extract, separating the protein containing extract from insoluble fiber materials, precipitating the protein from the extract by adjusting the pH of the extract to about the isoelectric point of the protein; and separating the precipitated protein from the extract. On a commercial scale, processes to refine soy protein products into soy protein concentrates and soy protein isolates are quite expensive, and the expense of the resultant processed soy materials has made them unattractive as cereal ingredients.

It is desirable, therefore, to obtain a cereal composition containing soy protein which utilizes relatively unprocessed soy protein containing ingredients but which contains little or no raffinose or stachyose and which has a pleasant taste. It is also desirable to provide a process for obtaining such a cereal composition.

SUMMARY OF THE INVENTION

In one aspect, the present invention is a ready-to-eat breakfast cereal for human consumption containing at least one cereal grain and a soy material selected from a soy flour, a soy grit, soy flakes, or mixtures thereof containing at most 20 $\mu$mol/g raffinose, at most 35 $\mu$mol/g stachyose, and at least 200 $\mu$mol/g sucrose. More preferably the soy material in the breakfast cereal composition contains at most 10 $\mu$mol/g raffinose and at most 10 $\mu$mol/g stachyose, and most preferably contains at most 5 $\mu$mol/g raffinose and 5 $\mu$mol/g stachyose.

In another aspect, the present invention is a ready-to-eat breakfast cereal for human consumption containing at least one cereal grain and a comminuted whole soybean material containing at most 20 $\mu$mol/g raffinose, at most 35 $\mu$mol/g stachyose, and at least 200 $\mu$mol/g sucrose. More preferably the comminuted whole soybean material in the breakfast cereal composition contains at most 10 $\mu$mol/g raffinose and at most 10 $\mu$mol/g stachyose, and most preferably contains at most 5 $\mu$mol/g raffinose and 5 $\mu$mol/g stachyose.

In a further aspect, the present invention is a process for producing a ready-to-eat breakfast cereal composition. A soy material selected from a soy flour, a soy grit, soy flakes, or a mixture thereof containing at most 20 $\mu$mol/g raffinose and 35 $\mu$mol/g stachyose, and at least 200 $\mu$mol/g sucrose, is blended with at least one cereal grain. The soy material and cereal grain are cooked to form a cereal dough, and a ready-to-eat breakfast cereal is formed from the cereal dough. In a preferred embodiment, the soy material and cereal grain are cooked by co-extruding the grain and the material.

In yet another aspect, the present invention is a process for producing a ready-to-eat breakfast cereal composition from whole soybeans. Whole soybeans are comminuted to form a comminuted soy material containing at most 20 $\mu$mol/g raffinose and 35 $\mu$mol/g stachyose, and at least 200 $\mu$mol/g sucrose. The comminuted soy material and at least one cereal grain are blended and cooked to form a cereal dough, and a ready-to-eat cereal is formed from the cereal dough.

In still another aspect, the present invention is a process for reducing coronary heart disease risk in a human by administering a cereal containing a soy material to a human, where the soy material contains at most 20 μmol/g raffinose and 35 μmol/g stachyose, and at least 200 μmol/g sucrose. Preferably the soy protein content in the cereal is effective to reduce total and low density lipoprotein cholesterol concentrations in the human's blood.

The ready-to-eat cereal compositions and the processes for producing them provided in the present invention offer significant advantages over known ready-to-eat breakfast cereals which contain soy protein. First, the compositions of the invention, and the processes for producing them, provide a ready-to-eat breakfast cereal that contains significant amounts of soy protein but which contains insignificant amounts of the intestinal gas-inducing raffinose and stachyose oligosaccharides. Therefore, the ready-to-eat breakfast cereal of the present invention is useful to provide a highly nutritious soy protein fortified breakfast cereal which does not cause intestinal gas or flatulence. Second, the breakfast cereal compositions of the present invention, and the processes for producing them, provide a better tasting soy protein containing cereal as a result of the high level of sucrose in the soy material.

Third, the processes of the present invention for producing the ready-to-eat soy protein containing cereals offer significant economical advantages over previous processes for incorporating soy protein into a breakfast cereal. Prior to the present invention soy protein had to be extensively processed to remove raffinose and stachyose oligosaccharides, either by forming a soy protein concentrate or a soy protein isolate. The process of the present invention utilizes a soy material selected from a soy flour, a soy grit, soy flakes, or a comminuted whole soybean material that inherently contains insignificant amounts of raffinose and stachyose so the soy material does not need to be further processed to remove undesirable oligosaccharides.

DESCRIPTION OF THE PREFERRED EMBODIMENTS

The composition of the present invention is a ready-to-eat breakfast cereal for human consumption containing a cereal grain and a soy material selected from a soy flour, a soy grit, soy flakes, or a comminuted whole soybean material, where the soy material contains at most 20 μmol/g raffinose, at most 35 μmol/g stachyose, and at least 200 μmol/g sucrose.
Low Raffinose, Low Stachyose, High Sucrose Soy Material A low raffinose, low stachyose, high sucrose soy material selected from a soy flour, a soy grit, soy flakes, or a comminuted whole soybean material is used in the composition of the present invention to reduce or prevent production of intestinal gas and flatus upon consumption of the breakfast cereal, as well as to provide a pleasant taste from the soy component of the cereal, while providing the cholesterol lowering benefits of soy protein. As used herein a "low raffinose" soy material is a soy material which contains at most 20 μmol/g raffinose, more preferably at most 10 μmol/g raffinose, and most preferably at most 5 μmol/g raffinose. The low raffinose soy material preferably inherently contains such low levels of raffinose without processing to remove the raffinose. As used herein a "low stachyose" soy material is a soy material which contains at most 35 μmol/g stachyose, more preferably at most 10 μmol/g stachyose, and most preferably at most 5 μmol/g stachyose. The low stachyose soy material preferably inherently contains such low levels of stachyose without processing to remove the stachyose. As used herein a "high sucrose" soy material is a soy material which inherently contains at least 200 μmol/g sucrose, and more preferably at least 210 μmol/g sucrose.

The low raffinose, low stachyose, high sucrose soy material may contain other selected traits which improve the flavor, appearance, or finctionality of the flour or comminuted whole soy bean material. For example, the flour or comminuted whole soybean material may have a modified seed storage protein content (for varied nutritional profiles); may contain little or no lipoxygenase (to enhance flavor); may contain little or no phytic acid and/or phytates (to enhance nutritional profile); may contain yellow hylum (to enhance apperance); and may have an enhanced isoflavone content relative to conventional soy materials (to provide additional health benefits).

The low raffinose, low stachyose, high sucrose soy material is present in the cereal composition in an amount sufficient to provide the nutritional benefits of the protein to a consumer of the cereal. Even more preferably, the soy material is present in the cereal composition in an amount sufficient to reduce the risk of coronary heart disease and reduce the total and low density lipoprotein cholesterol blood concentration of a human consumer as part of a soy protein dietary regimen, which is preferably at least 6.25 g per serving. As used herein, a "serving" is from 15 g to 60 g of the cereal, more preferably from 20 g to 40 g of the cereal, and most preferably from 25 g to 35 g of the cereal. Preferably, the low raffinose, low stachyose, high sucrose soy material forms from about 5% to about 65% of the cereal composition by weight, more preferably from about 10% to about 60% of the composition by weight, and most preferably from about 20% to about 50% of the composition by weight.

As used herein, "soybean" refers to the species Glycine max, Glycine soja, or any species that is sexually cross compatible with Glycine max. A "line" is a group of plants of similar parentage that display little or no genetic variation between individuals for at least one trait. Such lines may be created by one or more generations of self-pollination and selection, or vegetative propagation from a single parent including by tissue or cell culture techniques. "Mutation" refers to a detectable and heritable genetic change (either spontaneous or induced) not caused by segregation or genetic recombination. "Mutant" refers to an individual, or lineage of individuals, possessing a mutation.

The term "nucleic acid" refers to a large molecule which can be single-stranded or double-stranded, comprised of monomers (nucleotides) containing a sugar, a phosphate, and either a purine or a pyrimidine. A "nucleic acid fragment" is a fraction of a given nucleic acid molecule. "Complementary" refers to the specific pairing of purine and pyrimidine bases that comprise nucleic acids: adenine pairs with thymine and guanine pairs with cytosine. Thus, the "complement" of a first nucleic acid fragment refers to a second nucleic acid fragment whose sequence of nucleotides is complementary to the first nucleic acid sequence.

In higher plants, deoxyribonucleic acid (DNA) is the genetic material while ribonucleic acid (RNA) is involved in the transfer of information in DNA into proteins. A "genome" is the entire body of genetic material contained in each cell of an organism. The term "nucleotide sequence" refers to the sequence of DNA or RNA polymers, which can be single- or double-stranded, optionally containing synthetic, non-natural or altered nucleotide bases capable of incorporation into DNA or RNA polymers.

"Gene" refers to a nucleic acid fragment that expresses a specific protein, including regulatory sequences preceding (5' non-coding) and following (3' non-coding) the coding region. "RNA transcript" refers to the product resulting from RNA polymerase-catalyzed transcription of a DNA sequence. "Antisense RNA" refers to an RNA transcript that is complementary to all or part of an RNA transcript that is complementary to all or part of a primary target transcript and that blocks the expression of a target gene by interfering with the processing, transport, and/or translation of its primary transcript. The complementarity of an antisense RNA may be with any part of the specific gene transcript, i.e, at the 5' non-coding sequence, 3' non-coding sequence, introns, or the coding sequence. "Antisense inhibition" refers to the production of antisense RNA transcripts capable of preventing the expression of the target protein. "Cosuppression" refers to the expression of a foreign gene which has substantial homology to an endogenous target gene resulting in the suppression of expression of both the foreign and the endogenous gene.

"Promoter" refers to a DNA sequence in a gene, usually upstream (5') to its coding sequence, which controls the expression of the coding sequence by providing the recognition for RNA polymerase and other transcription factors. Promoters may also contain DNA sequences that are involved in the binding of protein factors which control the effectiveness of transcription initiation in response to physiological or developmental conditions.

"Raffinose saccharides" refers to the family of oligosaccharides with the general formula O-β-D-galactopyranosyl-$(1-6)_n$-α-glucopyranosyl-$(1-2)_n$-β-D-fructofuranoside where n=1 to 4. In soybean seeds, the term refers more specifically to the members of the family containing one (raffinose) and two (stachyose) galactose residues. Although higher galactose polymers are known (e.g. verbascose and ajugose), the content of these higher polymers in soybean is below standard methods of detection and therefore do not contribute significantly to total raffinose saccharide content.

The low raffinose, low stachyose, high sucrose soy material utilized in the present invention may be produced from soybeans which are derived from a soybean plant line having a heritable phenotype of low stachyose content. Stachyose and raffinose are produced in soybeans from glucose or sucrose starting materials by a series of enzymatically catalyzed reactions, where myo-inositol and galactinol are key intermediates in the formation of raffinose and stachyose. In soybeans myo-inositol-1-phosphate synthase catalyzes the formation of myo-inositol from sucrose (or glucose). Myo-inositol is utilized to form galactinol in conjunction with UDP galactose, where galactinol synthase catalyzes the reaction. Raffinose is formed from galactinol, catalzyed by the raffinose synthase enzyme, and stachyose is formed from raffinose and galactinol, catalyzed by the stachyose synthase enzyme.

Stachyose and raffinose accumulation in soybeans can be reduced or eliminated by selection or formation of soybean lines which under-express, express defectively, or do not express enzymes required for the formation of stachyose and raffinose. Selection or formation of soybean lines which under-express, express defectively, or do not express myo-inositol-1-phosphate synthase enzymes or galactinol synthase enzymes is particularly preferred to increase sucrose content in the soybean while decreasing or eliminating raffinose and stachyose concentrations.

PCT Publication No. WO98/45448 (Oct. 15, 1998), incorporated herein by reference, provides processes for producing a soybean plants with a heritable phenotype of a seed content of raffinose plus stachyose combined of less than 14.5 μmol/g and a seed sucrose content of greater than 200 μmol/g, where the phenotype is due to a decreased capacity for the synthesis of myo-inositol-1-phosphate in the seeds of the plant. In one method, soybean seeds are treated with a mutagenic agent, preferably NMU (N-nitroso-N-methylurea), the treated soybean seeds are sown and selfed for several generations, and the resulting soybean plants are screened for the desired phenotype. Soybean plants having the desired phenotype are homozygous for at least one gene encoding a mutant myo-inositol-1-phosphate synthase enzyme having decreased capacity for the synthesis of myo-inositol-1-phosphate which confers a heritable phenotype of low stachyose, low raffinose, and high sucrose concentrations in its soybeans.

LR33 (Accession Number ATCC97988, Date of Deposit Apr. 17, 1997) is a soybean line having a low raffinose, low stachyose, high sucrose phenotype disclosed in PCT Publication No. WO98/45448 which was produced by the mutagenic method described above. Preferably, a soybean line having the desired phenotype, such as LR33, is crossed with an agronomically elite soybean line to yield a hybrid, then the hybrid is selfed for at least one generation, and the progeny of the selfed hybrid are screened to identify soybean lines homozygous for at least one gene encoding a mutant myo-inositol 1-phosphate synthase having decreased capacity for the synthesis of myo-inositol 1-phosphate, where the gene confers a heritable phenotype of a seed content of raffinose plus stachyose combined of less than 14.5 μmol/g and a seed sucrose content of greater than 200 μmol/g. The resulting hybrid is preferably an agronomically elite soybean having low raffinose and stachyose content and high sucrose content.

In a second method provided by PCT Publication No. WO98/45448, soybean plants can be genetically modified to achieve gene silencing of myo-inositol 1-phosphate synthase with the resulting associated seed phenotype. The specification of the application provides the nucleotide sequence of the gene responsible for the expression of myo-inositol 1-phosphate synthase, which can be utilized to form a chimeric gene with suitable regulatory sequences for the co-suppression or under-expression of myo-inositol 1-phosphate synthase. The chimeric gene may be inserted into the genome of a soybean plant according to procedures set forth in the application to provide a soybean plant in which the chimeric gene results in a decrease in the expression of a native gene encoding a soybean myo-inositol 1-phosphate synthase. The soybean plant having a decreased expression of myo-inositol 1-phosphate synthase has a low raffinose, low stachyose, and high sucrose content.

U.S. Pat. No. 5,648,210 to Kerr et al., incorporated herein in its entirety, provides nucleotide sequences of galactinol synthase from zucchini and soybean and methods of incorporating such nucleotide sequences into soybean plants to produce a transgenic soybean line having a low raffinose, low stachyose, and high sucrose heritable phenotype. The provided nucletide sequences encode soybean seed galactinol synthase which, as noted above, is a key enzyme in the formation of raffinose and stachyose oligosaccharides from myo-inositol and UDP-galactose. Transfer of the nucleotide sequences encoding galactinol synthase in soybean into a soybean plant with suitable regulatory sequences that transcribe the antisense mRNA complementary to galactinol synthase mRNA, or its precursor, will result in the inhibition of the expression of the endogenous galactinol synthase gene, and, consequently, in reduced amounts of galactinol synthase, raffinose, and stachyose relative to untransformed soybean plants. Similarly, insertion of a foreign gene having substantial homology to the galactinol synthase gene into a soybean plant with suitable regulatory sequences may by utilized to inhibit the expression of the endogenous galactinol synthase gene by cosuppression.

The insertion and expression of foreign genes, such as the galactinol synthase nucleotide sequences provided in the '210 patent, in plants is well-established. See De Blaere et al. (1987) Meth. Enzymol. 153:277–291. Various methods of inserting the galactinol synthase nucleotide sequences into soybean plants in an antisense conformation are available to those skilled in the art. Such methods include those based on the Ti and Ri plasmids of Agrobacterium spp. It is particularly preferred to use the binary type of these vectors. Ti-derived vectors transform a wide variety of higher plants, including monocotyledonous and dicotyledonous plants such as soybean, cotton, and rape. [Pacciotti et al. (1985) Bio/Technology 3:241; Byrne et al. (1987) Plant Cell, Tissue and Organ Culture 8:3; Sukhapinda et al. (1987) Plant Mol. Biol. 8:209–216; Lorz et al (1985) Mol. Gen. Genet. 199:178; Potrykus (1985) Mol. Gen. Genet. 199:183]. Other transformation methods are available to those skilled in the art such as the direct uptake of foreign DNA constructs [see EPO publication 0 295 959 A2], techniques of electroporation [see Fromm et al. (1986) Nature (London) 319:791], or high velocity ballistic bombardment with metal particles coated with the nucleic acid constructs [see Kline et al. (1987) Nature (London) 327:70, and U.S. 4]. Once transformed, the cells can be regenerated by those skilled in the art.

Preferably selected promoters, enhancers, and regulatory sequences can be combined with the antisense galactinol synthase nucleotide sequence or a substantially homologous cosuppressing foreign gene to form a nucleic acid construct which will most effectively inhibit the expression of galactinol synthase with a minimum of disruption to the soybean plant. Particularly preferred promoters are constitutive promotors and promotors which allow seed-specific expression such as promotors of genes for α- and β-subunits of soybean β-conglycinin storage protein. A preferred enhancer is a DNA sequence element isolated from the gene for the α-subunit of β-conglycinin, as described in the '210 patent, which can confer 40-fold seed-specific enhancement to a constituitive promoter.

U.S. Pat. No. 5,710,365 to Kerr et al, incorporated herein in its entirety, provides further soybean lines having low raffinose and low stachyose content, which include specific soybean genes, designated stc1x, which confer a heritable phenotype of low stachyose and low raffinose content relative to conventional commercially available soybeans. The stc1x genes are likely mutant genes which encode defective raffinose synthase and stachyose synthase enzymes, thereby inhibiting the production of raffinose and stachyose in the soybean plants from the stc1x soybean lines. The stc1x soybean lines are obtained by 1) exhaustive screening of existing soybean germplasm collections for sources of genes conferring low raffinose saccharide content; 2) inducing a mutation in the Stc1 gene of a conventional soybean line by chemical mutagenesis; or 3) crossing stc1x soybean lines obtained by methods 1 or 2 to find soybean lines having modifier genes which further reduce the production of raffinose and stachyose in the soybean plant by enhancing the expression of the stc1x genes. Soybean line LR28 was developed by the first method and soybean line LR484 (Accession No. ATCC 75325) was developed by the second method.

Soybean lines developed in accordance with the '365 patent can be used to produce low raffinose, low stachyose and high sucrose soybeans useful in the present invention. Not all the soybean lines disclosed in the '365 patent will contain high sucrose content, however, since some of the lines will develop a high galactinol content rather than a high sucrose content. The soybean lines from the '365 patent which will be useful in the present invention, therefore, should be screened for a high sucrose content.

The low raffinose, low stachyose, soy material used in the compositions and processes of the present invention may be stacked to contain other selected traits which improve the flavor, appearance, or functionality of the flour or comminuted whole soy bean material. For example, one skilled in the art may genetically modify a soybean line to produce soybeans having a modified seed storage protein content (for varied nutritional profiles); or containing little or no lipoxygenase (to enhance flavor); or containing little or no phytic acid and/or phytates (to enhance nutritional profile); or containing yellow hylum (to enhance appearance); or having an enhanced isoflavone content relative to conventional commodity wild-type soybeans (to provide additional health benefits).

The low raffinose, low stachyose, high sucrose soy material selected from a soy flour, a soy grit, soy flakes, or a comminuted whole soybean material which is used in the breakfast cereal composition of the present invention may be produced from the low, raffinose, low stachyose, high sucrose soybeans described above, either with or without the enhancing stacked genetic traits. As used herein, the terms soy grit and comminuted whole soybean material are defined and are intended to encompass soy bits and soy nuts.

Low raffinose, low stachyose, high sucrose soy flakes for use in the cereal of the present invention may be produced from low raffinose, low stachyose, high sucrose soybeans by detrashing the soybeans; cracking the hulls of the detrashed soybeans; dehulling the soybeans; separating the cotyledonous portion of the dehulled soybeans from the hypocotyls, if desired; flaking the cotyledonous portion of the soybeans; and defatting the resulting soy flakes, if desired. All of the steps in forming the soy flakes, excepting the use of low raffinose, low stachyose, and high sucrose soybeans, may be performed according to conventional processes in the art for forming soy flakes with conventional equipment.

The soybeans may be detrashed by passing the soybeans through a magnetic separator to remove iron, steel, and other magnetically susceptible objects, followed by shaking the soybeans on progressively smaller meshed screens to remove soil residues, pods, stems, weed seeds, undersized beans, and other trash. The detrashed soybeans may be cracked by passing the soybeans through cracking rolls. Cracking rolls are spiral-cut corrugated cylinders which loosen the hull as the soybeans pass through the rolls and crack the soybean material into several pieces. Preferably the cracked soybeans are conditioned to 10% to 11% moisture at 63 to 74° C. to improve the storage quality retention of the soybean material. The cracked soybeans may be dehulled by aspiration. The hypocotyls, which are much smaller than the cotyledons of the soybeans, may be removed by shaking the dehulled soybeans on a screen of sufficiently small mesh size to remove the hypocotyls and retain the cotyledons of the beans. The hypocotyls need not be removed since they comprise only about 2%, by weight, of the soybeans while the cotyledons comprise about 90% of the soybeans by weight, however, it is preferred to remove the hypocotyls since they are associated with the beany taste of soybeans. The dehulled soybeans, with or without hypocotyls, are then flaked by passing the soybeans through flaking rolls. The flaking rolls are smooth cylindrical rolls positioned to form flakes of the soybeans as they pass through the rolls having a thickness of from about 0.01 inch to to about 0.015 inch.

The flakes may then be defatted, if a defatted soy material is desired, may be partially defatted, or the defatting step may be excluded if a full fat soy material is desired. The soy flakes, and any soy materials produced therefrom such as a soy flour or a soy grit, therefore, may range from fully defatted to full fat soy materials. Preferably the flakes are defatted for use in the cereal of the present invention to insure good keeping qualities of the final product and to permit proper processing of the cereal composition. The flakes, whether defatted, partially defatted, or fill fat, may be utilized as the soy material component in the breakfast cereal of the present invention.

The flakes may be defatted by extracting the flakes with a suitable solvent to remove the oil from the flakes. Preferably the flakes are extracted with n-hexane or n-heptane in a countercurrent extraction. The defatted flakes should contain less than 1.5% fat or oil content, and preferably less than 0.75%. The solvent-extracted defatted flakes are then desolventized to remove any residual solvent using conventional desolventizing methods, including desolventizing with a flash desolventizer-deodorizer stripper, a vapor desolventizer-vacuum deodorizer, or desolventizing by down-draft desolventization. Alternatively, the flakes may be defatted by a conventional mechanical expeller rather than by solvent extraction.

Preferably, the defatted flakes are then comminuted into a soy flour or a soy grit for incorporation into the breakfast cereal of the present invention. The flakes are comminuted by grinding the flakes to the desired particle size using conventional milling and grinding equipment such as a hammer mill or an air jet mill. Soy flour has a particle size wherein at least 97%, by weight, of the flour has a particle size of 150 microns or less (is capable of passing through a No. 100 mesh U.S. Standard Screen). Soy grits, more coarsely ground than soy flour, are defined for this invention as having a particle size greater than soy flour but smaller than soy flakes. Preferably the soy grit has a particle size of from 150 microns to about 1000 microns (is capable of passing though a No. 10–No. 80 U.S. Standard Screen).

A comminuted whole soybean material that has a low stachyose, low raffinose, and high sucrose content relative to conventional soybeans for use in the cereal of the present invention may also be formed from the low stachyose, low raffinose, and high sucrose content soybeans. The soybeans are detrashed as described above; optionally flaked and defatted utilizing the flaking and defatting processes described above with respect to soy flour; and comminuted with conventional milling and grinding equipment such as a hammer mill or an air jet mill, preferably to a particle size of 20 microns or less. The comminuted whole soybean materials include the hull, unlike soy flours, and therefore have a higher fiber content, which may be desirable in certain cereals. Preferably the whole soybeans are flaked and defatted to insure good keeping qualities of the final product and to aid in the processing of the whole soybean material into the cereal composition of the present invention.

Cereal Grain

The ready-to-eat breakfast cereal composition of the present invention contains at least one cereal grain, preferably selected from corn, wheat, rye, rice, oats, barley, and mixtures thereof. The cereal grains used in the present invention are commercially available, and may be whole grain cereals, but more preferably are processed from crops according to conventional processes for forming refined cereal grains. The term "refined cereal grain" as used herein also includes derivatives of cereal grains such as starches, modified starches, flours, other derivatives of cereal grains commonly used in the art to form cereals, and any combination of such materials with other cereal grains. A refined corn grain is preferably formed from U.S. No. 1 or No. 2 yellow dent corn by dry milling the corn to separate the endosperm from the germ and bran, and forming corn meal, corn grits, or corn flour from the endosperm. Refined wheat grain may be formed according to commercial milling practices from hard or soft wheat varieties, red or white wheat varieties, and may be a wheat flour containing little or no wheat bran, a wheat bran, or a milled wheat product containing flour, bran, and germ (whole wheat flour). Refined rye is preferably a rye flour which is formed according to commercial milling practices. Refined rice may be heads, second heads, or brewers rice which is formed by conventional practices for dehulling rough rice and pearling the dehulled rice, and preferably rough grinding the pearled and dehulled rice into a rice flour. Oats are refined by conventional practices into oat meal by dehulling and cleaning the oats to form oat groats, and milling the oat groats to form oat meal or oat flour. The refined oats may also be defatted. Barley is refined according to conventional practices into barley flakes or barley grits by dehulling and cleaning the barley to form clean barley which is pearled and flaked or ground to form the barley flakes or barley grits.

The ready-to-eat breakfast cereal composition of the present invention preferably contains from about 20% to about 90% of the cereal grains by weight of the total breakfast cereal composition. More preferably the composition contains from about 40% to about 75% of the cereal grains by weight of the total composition.

The composition may contain more than one of the cereal grains. For example, heavy wheat bran may be utilized in a multi-grain composition to increase the ease of flaking the composition and to improve the quality of the resulting flakes. Rice flour may be utilized in a multi-grain composition for increasing the puffing of the composition. The amount of each cereal grain utilized in the composition is dependent on the desired flavor, texture, and shape of the breakfast cereal, and may be selected according to these desired characteristics by a person skilled in the art of forming breakfast cereals.

Additional Components of the Ready-To-Eat Breakfast Cereal Composition

The ready-to-eat breakfast cereal composition may contain, and preferably does contain, additional components which enhance the flavor, color, shelf-stablility, and nutritional profile of the breakfast cereal composition of the present invention. Commercially available barley malt may be added to the composition to provide flavor and color to the breakfast cereal. Preferably the breakfast cereal composition contains from 0% to about 5% malt by weight. Sugar is preferably added to provide flavor, color, and texture to the breakfast cereal composition, and may be added as white cane sugar, brown sugar, invert syrup, or mixtures thereof, depending on the color and flavor characteristics desired in the breakfast cereal composition. Preferably the breakfast cereal composition contains from about 0% to about 25% sugar, by weight, and more preferably contains from about 5% to about 15% sugar by weight. The breakfast cereal composition may also contain other sweeteners such as maltodextrins, corn syrup solids, corn syrup, and high fructose corn syrup. Typically these sweeteners will be utilized in place of a portion of the sugars in the composition. Salt (sodium chloride) may be included in the breakfast cereal composition as a flavor blending agent. Preferably the composition will contain from about 0% to about 3% salt by weight. Vitamins and minerals may be included in the composition to nutritionally fortify the breakfast cereal. Preferably the composition will contain from about 0% to about 2% vitamins and minerals, by weight.

Preparation of Low Raffinose, Low Stachyose, High Sucrose Soy Containing Breakfast Cereals The ready-to-eat breakfast cereals of the present invention are formed in three basic steps: forming a low raffinose, low stachyose, high sucrose soy flour, grit, flake, or comminuted whole soybean material from low raffinose, low stachyose, high sucrose soybeans; blending at least one cereal grain and the prepared soy material to form a cereal dough; and forming a ready-to-eat cereal from the cereal dough. The step of forming a low raffinose, low stachyose, high sucrose soy flour, grit, flake, or comminuted whole soybean material is discussed above. Most preferably a defatted low raffinose, low stachyose, high sucrose soy flour is used to form the breakfast cereal.

The step of blending the cereal grain and the prepared soy material to form a cereal dough includes the substeps of blending the cereal grain, the soy material, and any additional components such as malt, sugar, salt, and nutrients, and cooking the blended ingredients to form a gelatinized or "cooked" dough. A blended dry feed may be formed from the dry soy and cereal grain ingredients, which are typically dry blended in a conventional blender such as a ribbon blender for a period of time sufficient to ensure that the ingredients are thoroughly mixed, preferably about 4 minutes to about 20 minutes. Each dry ingredient is weighed and added into the mixture in preselected proportions, where the proportions are selected based on the desired characteristics of the breakfast cereal composition. The effect of specific cereal grains on breakfast cereal compositions and required proportions of such cereal grains to obtain desired breakfast cereal characteristics is conventional knowledge to one skilled in the art of preparing ready-to-eat breakfast cereals.

A liquid feed may be prepared of some or all of the ingredients of sugar, salt, barley malt or malted barley extract, and nutrients for addition to the blended dry feed prior to cooking the blended ingredients. The desired ingredients are weighed and added to a mixing tank in the desired proportions and water is added to the tank. The liquid feed ingredients are then mixed for a period of time sufficient to thoroughly blend the ingredients.

The blended dry feed and liquid feed are then combined and cooked to form a cereal dough. The cooked cereal dough may be prepared by cooking in various well known manners, including both batch cooking and continuous cooking. Different methods of cooking include heating the mixed dry and liquid feeds at elevated pressure in a tumbling type mixer, heating at atmospheric pressure in an agitated kettle, and, most preferably, heating under high pressure in a continuous mixer extruder.

In the preferred method of preparing the cooked cereal, the dry feed and liquid feed are mixed under pressure in a conventional single screw or twin screw cooker extruder into which steam is injected to heat and cook the mixture. Preferably, prior to introducing the dry feed mixture into the extruder, the dry feed mixture is moisturized with steam in a preconditioner to hydrate the dry feed for ease of processing in the extruder. It is preferable to moisturize the soy protein containing dry feed to a greater extent than if the dry feed contained only a cereal grain to obtain adequate rheology of the extruded cereal dough. The feed is preferably moisturized in the preconditioner to at least 10% moisture, however, the feed/dough may be additionally moisturized to acquire the desired rheology in the process of extrusion. The dry feed and liquid feed are combined at the inlet end of the extruder for combined mixing and cooking as the materials pass through the extruder.

The operating conditions of the cooker extruder are selected to substantially gelatinize the cereal dough. The cooker extruder typically is operated so the exit temperature of the extruder is from about 180° F. to about 310° F. and the residence time of the feed materials is from about 30 seconds to about 20 minutes, preferably from about 45 seconds to 120 seconds. The operating conditions, however, may be modified to change the cooking conditions as desired by one skilled in the art. For example, longer residence times may be used to provide a cooked cereal flavor in the cereal composition.

The cooked cereal dough is extruded from the cooking extruder, and may be cut into dough pellets or beads at the extrusion orifice of the cooking extruder if the finished breakfast cereal is to be a puffed cereal. Extrusion of the cooked cereal at the relatively high cooking temperatures through the extrusion orifice of the cooking extruder causes the extruded cereal dough to expand and puff upon exiting the extruder. The puffed cereal dough extrudate may be cut into puffed cereal dough beads with a conventional pelletizer located adjacent the extrusion orifice of the cooking extruder. The pelletizer blade cuts the extrudate into pellets of a selected size at the exit of the cooking extruder.

If, however, the cooked cereal dough exiting the cooking extruder is to be formed into cereal flakes or is to be shredded, the extrudate may be directed from the cooking extruder to a conventional forming extruder to reduce or eliminate the puffing effect of extrusion from the cooking extruder at cooking temperatures. The forming extruder may be a single screw or twin screw extruder which is configured to allow cooling water to circulate in the extruder. The forming extruder recompresses and cools the cooked dough mass, and then extrudes the cooled cooked dough mass through a die plate, preferably so the dough mass has a temperature of from about 115° F. to about 160° F. upon exiting the forming extruder. The dough puffs little, if at all, when extruded at these low temperatures since moisture contained in the extrudate does not flash off upon exiting the extruder. Typically the die plate of the forming extruder will have numerous openings, preferably from about 15 to about 30 openings, through which the dough mass is extruded.

A conventional pelletizer may be used to form dough beads of selected shapes and sizes from the cooked dough as it is extruded from the forming extruder. The pelletizer blades cut the dough extrudate rope into beads or pellets for further processing into flakes or shredded cereal.

After cooking and pelletizing the dough, the cereal dough beads may be further conditioned for processing into a finished cereal material. The dough beads are preferably delumped by breaking up lumps of the cereal dough with a conventional bead beater or delumper on a shaking screen, where delumped beads of the proper size pass through the shaking screen. The delumped beads are easier to cool and to dry to a uniform moisture content.

The dough beads may also be dried, if necessary, to lower the moisture content of the beads to a level at which the dough beads can be further processed into a finished cereal product, typically from 10% to about 18% moisture, by weight. The dough beads may be dried in conventional breakfast cereal dryers for a time sufficient to obtain the desired moisture content. Drying is not necessary if the moisture content of the dough beads is less than 18%, but should be effected if the moisture content of the beads is above 21%.

After drying the cereal dough beads, the beads may be tempered. The beads are tempered by allowing the beads to sit in a tempering bin until the moisture level in the beads and between the beads equilibrates. Typically, the beads are tempered for a time period of from about 4 hours to about 10 hours. Tempering, however, is not always necessary, and should be effected only if there is a substantial difference between the internal moisture and the external moisture levels of the dough beads. When the breakfast cereal to be formed is a flaked cereal, it is desirable to avoid a uniform internal and external moisture level in the beads so the flakes will curl, therefore, it may be desirable to avoid tempering the cereal dough beads when flaked cereal is to be produced unless there is a great difference between the surface moisture and the internal moisture of the beads.

The finished ready-to-eat breakfast cereal is then formed from the cooked delumped cereal dough beads, whether dried and/or tempered or not. The non-puffed cereal dough beads may be flaked to form cereal flakes or may be shredded. The puffed cereal dough beads are used to form a puffed breakfast cereal.

To form a flaked breakfast cereal, the cooked delumped cereal dough beads are flaked and then toasted. The cereal dough beads can be flaked using conventional flaking processes and equipment. The dough beads are flaked by passing the beads through a conventional flaking roll. Preferably the flaking roll contains two counter-rotating rolls which are maintained at a roll surface temperature of between about 75° F. and 90° F. by circulation of cold water (55° F. to 60° F.) through the interior of the rolls. The clearance between the rolls of the flaking roll is adjusted to provided flakes of the desired size, and preferably is adjusted from about 1/1000 inch to 2/1000 inch.

The resulting flakes are dried and toasted to provide the finished flaked cereal. The flakes may be dried and toasted using conventional processes and equipment for drying and toasting cereal flakes. Preferably the flakes are dried and toasted in a conventional flake-toasting oven for a period of time sufficient to reduce the moisture content of the flakes to a desired level. The resulting flakes preferably have a moisture content of from about 1% to about 3.5%, by weight.

To form a finished puffed or expanded breakfast cereal product, puffed delumped cereal dough beads are dried and toasted. The puffed cereal dough beads may be dried and toasted using conventional processes and equipment for drying and toasting puffed cereal pieces. Preferably the puffed cereal pieces are dried and toasted in a conventional toasting oven for a period of time sufficient to reduce the moisture content of the puffed pieces to a desired level, typically from about 1% to about 3.5% moisture, by weight.

To form a shredded breakfast cereal, the cooked delumped cereal dough beads are shredded and baked. The cereal dough beads are shredded using conventional processes and equipment for forming shredded cereal products. The dough beads are shredded by passing the beads through a conventional shredding roll. Preferably the shredding roll is formed of two counter-rotating rolls in contact with each other, one smooth the other grooved, which are maintained at a roll surface temperature of about 75° F. to about 100° F. by water circulating in the interior of the rolls. The shredded cereal dough is removed from the grooved roll by a comb to form the cereal shreds. The cereal shreds are crimped together into biscuits by a conventional cutter which compresses the shreds and makes them stick together.

The shredded biscuits are then baked to dry the cereal and form the finished cereal product. Preferably the shredded biscuits are baked in a conventional continuous band oven to a desired moisture content, which is preferably from about 1% to about 3.5% moisture, by weight. If the shredded cereal contains substantial amounts of corn or rice grains the shredded cereal should be puffed or opened up during baking to prevent the cereal from being excessively hard and flinty in texture. The shredded cereal may be puffed during baking by heating the shredded cereal to a high temperature (550–650° F.) immediately prior to exiting the oven so that moisture in the shreds will flash off as the shreds exit the oven, thereby puffing the shreds.

Use of Low Raffinose Low Stachyose High Sucrose Soy Containing Breakfast Cereals for Lowering Cholesterol and Reducing the Risk of Coronary Heart Disease.

The low raffinose, low stachyose, high sucrose soy containing breakfast cereals of the present invention may be utilized as part of a cholesterol lowering diet. Numerous scientific studies have shown that soy protein is effective to lower total and low-density lipoprotein blood cholesterol levels in humans as part of a regular diet in hypercholestermic individuals, typically between a 5% and 30% reduction. The U.S. Food and Drug Administration (FDA) has issued a ruling that foods containing soy protein may include a label that states that such foods, in conjunction with a diet low in saturated fat and cholesterol, may reduce the risk of coronary heart disease (21 CFR §101.82—issued Oct. 26, 1999).

A breakfast cereal of the present invention may be utilized as part of a diet to lower blood cholesterol and reduce the risk of coronary heart disease. The breakfast cereal does not cause raffinose and stachyose related gas discomfort and has a pleasant taste while providing the health benefits of soy protein.

The daily dietary intake of soy protein associated with significantly lowering blood cholesterol concentrations and reducing the risk of coronary heart disease is 25 g/day. The breakfast cereal may be formulated to contain 25 g of soy protein per serving to meet the entire daily dietary requirements of soy protein for reducing the risk of coronary heart disease, or the breakfast cereal may be formulated to contain only a portion of the daily soy dietary requirement per serving.

Preferably the breakfast cereal of the present invention contains a portion of the daily soy dietary requirement for lowering cholesterol and reducing the risk of heart disease per serving and is used in conjunction with other soy protein containing foods and/or beverages to provide these health benefits. Most preferably the breakfast cereal of the present invention contains at least 6.25 g of soy protein per serving, which is the amount required by the FDA to make a health related claim.

The following examples illustrate breakfast cereal compositions of the present invention and processes for producing them. These examples are intended to demonstrate the utility and benefit of the breakfast cereal compositions of the present invention and should not be interpreted as limiting the scope of the invention.

EXAMPLE 1

Low Raffinose Low Stachyose High Sucrose Soy Bran Flakes

A ready-to-eat flaked breakfast cereal is prepared containing bran and low raffinose, low stachyose, high sucrose soy flour. A dry feed containing 45.5% whole wheat flour (Buccaneer, Con Agra) by weight; 45.5% low raffinose, low stachyose, high sucrose soy flour, by weight; and 9.0% heavy bran (Heavy Bran #2, Knappen Milling Co., Augusta Mich.), by weight, is formed by blending the ingredients in a ribbon blender for 5 minutes. A liquid feed containing 46.7% sugar, by weight; 28.5% water, by weight; 14.3% malted barley extract (Maltotine ER, Crompton & Knowles Corp.), by weight; 9.4% salt, by weight; and 1.1% caramel color (Sethness BC420 powdered caramel color, Sethness Products Co., Chicago, Ill.), by weight is prepared by mixing the ingredients in a mixing vat. The temperature of the liquid feed is maintained at 40° C. prior to the liquid feed being introduced into the cooker extruder.

The dry feed is placed in a preconditioner. Steam is injected into the dry feed in the preconditioner at a rate of 16 kg/hr to hydrate and condition the dry feed. The dry feed is hydrated from a moisture level of 9.22%, by weight, to 20.11%, by weight, in the preconditioner. The hydrated dry feed is discharged from the preconditioner at a temperature of 84° C.

The conditioned, hydrated dry feed and the liquid feed are introduced into a twin-screw, co-rotating fully intermeshing cooking extruder (Model TX57, Wenger Mfg., Sabetha, Kans.). The extruder is run at an extruder shaft speed of 347 rpm. The dry feed and the liquid feed are processed through the extruder and are mixed and cooked to form a dough mass. The dough mass is extruded from the extruder through a pipe die equipped with a ¾ inch diameter orifice inserted into a 2.5 inch diameter stainless steel transition pipe.

Upon exiting the transition pipe the dough mass is fed into a single screw forming extruder (Model F-25, Wenger Mfg.). The hot dough mass is extruded through the forming extruder at an extruder shaft speed of 25 rpm. Cooling water is circulated in the forming extruder, and the hot dough mass is cooled and recompressed in the forming extruder. The dough mass is extruded from the forming extruder through a die plate containing 20 openings. A pelletizer is used to produce dough beads from the dough as it is extruded from the die plate of the forming extruder. The temperature of the dough beads immediately upon extrusion and pelletization is in the range of 50–60° C.

The dough beads are conveyed to a conditioning reel where they are allowed to cool and reach an internal moisture equilibrium. Upon discharge from the conditioning reel, the dough beads have a moisture content of 25%, by weight and a temperature of 35–40° C. The conditioned beads are dropped onto a shaking screen where a bead beater mounted on the shaking screen breaks lumps of beads to facilitate the beads passing through the shaking screen.

The cooled, conditioned, and delumped beads are passed through a flaking roll (Model 1360, Wenger Mfg.) to form flakes. The flaking roll contains two smooth counter-rotating rolls, one 24 inches in diameter and the other 14 inches in diameter. The clearance between the rolls is set to $\frac{1}{1000}$ inch and the linear speed at the roll surface is 1135 ft/sec. The temperature of the roll surface is maintained at 75–80° F. by circulating cool water in the interior of the rolls.

The formed flakes are conveyed to a drying and toasting system (Series VI Model 600, Wenger Mfg.) having a single-path drying section and two single-path toasting sections. The temperature in the drying section is maintained at 180° C., and the temperature in each of the toasting sections is maintained at 165° C. The flakes are retained in the drying section for a period of 1 minute and are retained in the combined toasting sections for two minutes. The flakes have a moisture level of 2.5% upon discharge from the dryer/toaster. The finished flakes are then discharged from the dryer/toaster and allowed to cool.

The resulting flakes contain by weight: 40.3% whole wheat flour, 8.0% heavy bran, 40.3% low raffinose, low stachyose, high sucrose soy flour, 0.2% caramel color, 7.4% sugar, 2.3% malt, and 1.5% salt. The flakes contain 6.8 g of soy protein per 30 g serving.

EXAMPLE 2
Comparison of Low Raffinose, Low Stachyose, High Sucrose Soy Bran Flakes With Bran Flakes Made With Conventional Soy Flour and With Traditional Bran Flakes Containing No Soy The low raffinose, low stachyose, high sucrose soy bean flakes formed in example 1 above are compared with bran flakes made with conventional soy flour and with traditional bran flakes made with no soy.

Cereal bran flakes are made with conventional soy flour in the manner described above in Example 1 with respect to cereal bran flakes containing low raffinose, low stachyose, and high sucrose soy flour except that conventional commodity soy flour is substituted in the dry feed preparation for the low raffinose, low stachyose, high sucrose soy flour. The composition of the resulting flakes is similar to that of the flakes in Example 1 except conventional soy flour is substituted for low raffinose, low stachyose, high sucrose soy flour.

Cereal bran flakes containing no soy are also prepared in the manner described above in Example 1, except that no soy flour of any type is used in the dry feed preparation. The dry feed is prepared with 60.1% whole wheat flour, by weight, and 39.9% heavy bran, by weight. The resulting flakes contain by weight: 53.2% whole wheat flour, 35.3% heavy bran, 0.2% caramel coloring, 7.4% sugar, 2.3% malt, and 1.5% salt.

Samples of the low raffinose, low stachyose, high sucrose soy flour containing flakes (the "HS sample"), the conventional commodity soy flour containing flakes (the "CV sample") and the non-soy containing flakes ("Control sample") are evaluated for bowl life, appearance, taste, and texture. Appearance, taste, and texture are evaluated by a panel of persons selected as likers and users of flaked breakfast cereals.

The bowl life of the samples is evaluated by placing log of each sample in a bowl, adding 100 ml of 2% milk to the cereal sample, and evaluating the cereal for crunchiness at 0.5, 1, 2, and 3 minutes. Scores are given to each sample on a scale of 1 to 10 with 1 being equivalent to the crunchiness at time 0 and 10 being completely mushy. The HS sample is found to maintain a higher degree of crispness and cruchiness in milk than either the CV sample or the Control sample, which have comparable bowl lives.

The appearance of the samples is evaluated by visual assessment of the color and physical characteristics of the samples. The soy containing HS and CV samples are found to have less grayish color and more golden brown color than the Control sample, and the HS sample is found to have a brighter, less dull, and more uniform color than the CV sample. The surface smoothness and the internal porosity of the Control, HS, and CV samples are found to be comparable.

The taste of the samples is evaluated by taste testing the cereal flake samples. The Control sample has the characteristic flavor profile of bran flakes. The HS and CV samples have less intensity of bran flavor. The HS sample has a cleaner taste than the CV sample with less beany/soy notes present.

The texture of the samples is evaluated by taste testing and chewing the cereal flake samples. The Control and HS samples provide better crispiness, crunchiness, and tender texture than the CV sample.

EXAMPLE 3
Low Raffinose, Low Stachyose, High Sucrose Multi-Grain Flakes

A ready-to-eat multi-grain flaked breakfast cereal is prepared containing low raffinose, low stachyose, high sucrose soy flour. A dry feed containing by weight: 3.7% whole wheat flour (Buccaneer, Con Agra); 33.6% corn flour (Con Agra); 16.8% rice flour (RL-100, Riviana, Houston Tex.); and 44.8% low raffinose, low stachyose, high sucrose soy flour, is formed by blending the ingredients in a ribbon blender for 5 minutes. A liquid feed containing by weight: 47.2% sugar, 14.7% malted barely extract (Maltoline ER, Crompton & Knowles Corp.), .6% salt, and 28.5% water is mixed in a mixing vat. The dry feed is preconditioned and extruded with the liquid feed as set forth in Example 1 to form a cereal dough. The dough is beaded, conditioned, delumped, flaked, dried and toasted as described in Example 1 to form the multi-grain cereal flakes containing low raffinose, low stachyose, high sucrose soy.

The resulting flakes contain, by weight: 3.3% whole wheat flour; 30.2% corn flour; 15.1% rice flour; 40.2% low raffinose, low stachyose, high sucrose soy flour; 7.4% sugar; 2.3% malt; and 1.5% salt. The flakes contain 6.72 g of soy protein per 30 g serving.

EXAMPLE 4

Expanded (Puffed) High Oat Multi-Grain Cereal Rings Containing Low Raffinose, Low Stachyose, High Sucrose Soy Flour A ready-to-eat puffed breakfast cereal is prepared having a high oat content and containing a low raffinose, low stachyose, high sucrose soy flour. A dry feed containing, by weight: 39.2% low raffinose, low stachyose, high sucrose soy flour; 35.7% defatted oat flour (Con Agra); 20% rice flour (Riviana, Houston Tex.); 2.8% sugar; 1.5% salt; and 0.75% baking soda (Arm & Hammer) is mixed for 5 minutes in a ribbon blender. The dry feed is fed into a preconditioner. Water is injected into the dry feed in the preconditioner to hydrate the dry feed from a moisture level of 6.6% to 10.4%. The hydrated dry feed is discharged from the preconditioner at a temperature of 26° C.

The hydrated dry feed is introduced into a twin-screw, co-rotating fully intermeshing cooking extruder (Model TX57, Wenger Mfg.). The extruder is run at an extruder shaft speed of 221 rpm. Water is introduced into the extruder along with the dry feed, and the mixture is processed through the extruder to form a dough mass. The dough mass is extruded from the cooking extruder through a die orifice having an inside diameter of 0.22 inch and an outside diameter of 0.37 inch to form cooked dough rings. The dough mass expands as it is extruded from the cooking extruder. A pelletizer is used to cut the dough mass into puffed dough rings as the dough is extruded from the extruder.

The puffed dough rings produced by the pelletizer are conveyed to a drying and toasting system (Series VI Model 600, Wenger Mfg.) having a single-path drying section and two single-path toasting sections. The temperature in the drying section is maintained at 165° C. and the puffed dough beads are retained in the drying section for 1.6 minutes. The dough rings exit the drying section and enter the first toasting section where the temperature is maintained at 100° C. and the dough rings reside for 1.3 minutes. The dough rings pass from the first toasting section to the second toasting section where the temperature is maintained at 100° C. and the dough rings reside for 1.3 minutes. The puffed cereal pieces have a moisture level of 2.86%, by weight, upon discharge from the dryer/toaster. The finished puffed cereal pieces are discharged from the dryer/toaster and allowed to cool. The finished puffed oat rings contain 6.6 g of soy protein per 30 g serving.

EXAMPLE 5

Expanded (puffed) Multi-Grain Cereal Rings Containing Bran and Low Raffinose Low Stachyose, High Sucrose Soy Flour A ready-to-eat multi-grain puffed breakfast cereal is prepared containing bran and a low raffinose, low stachyose, high sucrose soy flour. A dry feed containing, by weight: 40% low raffinose, low stachyose, high sucrose soy flour; 36% heavy bran (Heavy Bran #2, Knappen Milling Co., Augusta Mich.); 10% rice flour (Riviana, Houston Tex.); 8% sugar; 4.2% brown sugar (Turbinado sugar, C&H Sugars, Crockett Calif.); 1% salt; 0.75% baking soda (Arm & Hammer); and 0.05% caramel color (Sethness BC420 powdered caramel color, Sethness Products Company, Chicago Ill.) is mixed for 5 minutes in a ribbon blender. The dry feed is preconditioned, cooked and extruded, and dried and toasted in a manner similar to that described above with respect to the high oat multigrain cereal rings to form bran containing cereal rings containing a low raffinose, low stachyose, high sucrose soy material. The puffed multi-grain cereal rings contain 12.54 g of soy protein per 30 g serving.

What is claimed is:

1. A composition comprising a ready-to-eat cereal for human consumption containing at least one cereal grain and a soy material selected from a soy flour, soy grits, soy flakes, a comminuted whole soybean material, or combinations thereof, said soy material inherently containing at most 20 $\mu$mol/g raffinose, at most 35 $\mu$mol/g stachyose, and at least 200 $\mu$mol/g sucrose.

2. The cereal composition of claim 1 wherein said soy material contains at most 10 $\mu$mol/g raffinose and at most 10 $\mu$mol/g stachyose.

3. The cereal composition of claim 1 wherein said soy material is derived from a soybean line having a heritable phenotype of low stachyose content.

4. The cereal composition of claim 3 wherein said soybean line is a line derived by genetic selection of a soybean line having a phenotype of low stachyose content, mutagenesis, or genetic modification.

5. The cereal composition of claim 1 wherein said soy material comprises from about 10% to about 60%, by weight, of said composition.

6. The cereal composition of claim 5 wherein said soy material comprises from about 20% to about 50%, by weight, of said composition.

7. The cereal composition of claim 1 wherein said cereal grain is selected from the group consisting of corn, wheat, rye, rice, oats, barley, and mixtures thereof.

8. The cereal composition of claim 1 wherein said cereal grain contains at least one whole grain cereal grain.

9. The cereal composition of claim 1 wherein said cereal grain contains at least one refined cereal grain.

10. The cereal composition of claim 9 wherein said refined cereal grain is a starch, a modified starch, a flour, or a combination thereof.

11. The cereal composition of claim 1 wherein said soy material is defatted.

12. The cereal composition of claim 1 wherein said cereal composition is a flaked ready-to-eat cereal.

13. The cereal composition of claim 1 wherein said cereal composition is a puffed ready-to-eat cereal.

14. The cereal composition of claim 1 wherein said cereal composition is a shredded ready-to-eat cereal.

15. The cereal composition of claim 1 wherein a 30 g serving of said cereal composition contains at least 6.25 g of soy protein.

16. The cereal composition of claim 1 further comprising an ingredient selected from the group consisting of malt, malted extract, white cane sugar, brown sugar, invert sugar, maltodextrin, corn syrup solids, corn syrup, high fructose corn syrup, salt, baking soda, a vitamin, a mineral, or a combination thereof.

17. The cereal composition of claim 1 wherein said soy material contains reduced levels of lipoxygenase, phytic acid, or phytate, relative to a soy material derived from wild-type soybeans, or wherein said soy material contains yellow hylum.

18. The cereal composition of claim 1 wherein said soy material contains an enhanced level of isoflavones relative to a soy material derived from wild-type soybeans.

19. The cereal composition of claim 1 wherein said soy material has a modified seed storage protein content relative to a soy material derived from wild-type soybeans.

20. A process for producing a ready-to-eat cereal composition comprising:

blending at least one cereal grain and a soy material selected from soy flour, soy grits, soy flakes, a comminuted whole soybean material, or combinations thereof, said soy material inherently containing at most 20 $\mu$mol/g raffinose and 35 $\mu$mol/g stachyose, and at least 200 $\mu$mol/g sucrose;

cooking said cereal grain and said soy material to form a cereal dough; and forming a ready-to-eat cereal from said cereal dough.

21. The process of claim 20 wherein said soy material is derived from soybeans of a soybean line having a heritable phenotype of low stachyose content.

22. The process of claim 21 wherein said soybean line is a line derived by genetic selection of a soybean line having a phenotype of low stachyose content, mutagenesis, or genetic modification.

23. The process of claim 20 wherein said soy material is formed from whole soybeans having at most 20 $\mu$mol/g raffinose and 35 $\mu$mol/g stachyose and at least 200 $\mu$mol/g sucrose by dehulling, degerming, and comminuting said whole soybeans.

24. The process of claim 20 wherein said soy material is defatted.

25. The process of claim 20 wherein said soy material contains reduced levels of lipoxygenase, phytic acid, or phytate, relative to a soy material derived from wild-type soybeans, or wherein said soy material contains yellow hylum.

26. The process of claim 20 wherein said soy material contains an enhanced level of isoflavones relative to a soy material derived from wild-type soybeans.

27. The process of claim 20 wherein said soy material has a modified seed storage protein content relative to a soy material derived from wild-type soybeans.

28. The process of claim 20 wherein said cereal grain is selected from the group consisting of corn, wheat, rye, rice, oats, barley, and mixtures thereof.

29. The process of claim 28 wherein said cereal grain is refined.

30. The process of claim 29 wherein said refined cereal grain is selected from starch, modified starch, flour, or a combination thereof.

31. The process of claim 20 wherein said soy material forms from about 10% to about 60% of the total weight of said ready-to-eat cereal.

32. The process of claim 31 wherein said soy material forms from about 20% to about 50% of the total weight of said ready-to-eat cereal.

33. The process of claim 20 wherein said cereal grain and soy material are cooked by co-extruding said cereal grain and said soy material.

34. The process of claim 20 wherein said cereal dough is flaked and toasted to form ready-to-eat cereal flakes.

35. The process of claim 20 wherein said cereal dough is puffed and toasted to form ready-to-eat puffed cereal pieces.

36. The process of claim 20 wherein said cereal dough is shredded and baked to form a ready-to-eat shredded cereal.

37. The process of claim 20 further comprising the step of adding malt, malted extract, white cane sugar, brown sugar, invert sugar, maltodextrin, corn syrup solids, corn syrup, high fructose corn syrup, salt, baking soda, at least one vitamin, at least one mineral, or mixtures thereof to said blend of said cereal grain and said soy material prior to cooking said cereal grain and said soy material.

38. A process for reducing coronary heart disease risk in a human comprising administering to a human a cereal containing a soy material where said soy material is selected from soy flour, soy grits, a comminuted whole soybean material, or combinations thereof, and said soy material inherently contains at most 20 $\mu$mol/g raffinose and 35 $\mu$mol/g stachyose, and at least 200 $\mu$mol/g sucrose.

39. The process of claim 38 wherein said cereal is co-administered to said human in combination with other soy protein containing foods or beverages to provide said human at least 25 g of soy protein per day.

40. The process of claim 39 wherein said cereal provides at least 6.25 g of soy protein per serving.

41. The process of claim 38 wherein said soy protein content in said cereal is effective to reduce total and low density lipoprotein cholesterol concentrations in said human's blood.

\* \* \* \* \*